(12) United States Patent
Wang et al.

(10) Patent No.: US 9,414,266 B2
(45) Date of Patent: Aug. 9, 2016

(54) THROUGHPUT FOR INTER-RADIO ACCESS TECHNOLOGY HANDOVER

(71) Applicant: AT&T Intellectual Property I, L.P., Atlanta, GA (US)

(72) Inventors: Jiansong Wang, Naperville, IL (US); Ryan Redfern, Cerritos, CA (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 0 days.

(21) Appl. No.: 14/146,581

(22) Filed: Jan. 2, 2014

(65) Prior Publication Data

US 2014/0161065 A1 Jun. 12, 2014

Related U.S. Application Data

(63) Continuation of application No. 13/112,655, filed on May 20, 2011, now Pat. No. 8,625,534.

(51) Int. Cl.
| | | |
|---|---|---|
| *H04W 4/00* | (2009.01) | |
| *H04W 28/24* | (2009.01) | |
| *H04W 28/18* | (2009.01) | |
| *H04W 88/06* | (2009.01) | |
| *H04W 36/14* | (2009.01) | |
| *H04W 76/04* | (2009.01) | |

(52) U.S. Cl.
CPC .............. *H04W 28/24* (2013.01); *H04W 28/18* (2013.01); *H04W 88/06* (2013.01); *H04W 36/14* (2013.01); *H04W 76/04* (2013.01)

(58) Field of Classification Search
USPC ......... 370/331, 230.1, 231, 332, 333, 395.21; 455/103, 500, 522, 69
See application file for complete search history.

(56) References Cited

U.S. PATENT DOCUMENTS

| | | | |
|---|---|---|---|
| 7,280,505 B2 | 10/2007 | Chaskar et al. | |
| 2004/0218533 A1* | 11/2004 | Kim et al. | 370/235 |
| 2006/0003767 A1* | 1/2006 | Kim et al. | 455/436 |
| 2006/0105717 A1* | 5/2006 | Kwon et al. | 455/63.1 |
| 2006/0259628 A1 | 11/2006 | Vadlapudi et al. | |

(Continued)

FOREIGN PATENT DOCUMENTS

| | | |
|---|---|---|
| WO | 2004034592 A1 | 4/2004 |
| WO | 2006110021 A1 | 10/2006 |

(Continued)

OTHER PUBLICATIONS

International Search Report and Written Opinion, dated Jun. 28, 2012, for International Application No. PCT/US2012/029945, 13 pages.

(Continued)

*Primary Examiner* — Zewdu A Beyen
(74) *Attorney, Agent, or Firm* — Amin, Turocy & Watson, LLP

(57) ABSTRACT

Aspects describe renegotiation of quality of service parameters to resolve maximum bit rate mismatches and/or other quality of service parameter mismatching issues that might arise during an inter-radio access technology handover. At about the same time as a mobile device moves from a source network to a target network, the target network dynamically initiates a quality of service modification procedure. The quality of service modification procedure can help resolve the maximum bit rate mismatches and/or the other quality of service parameter mismatching issues.

20 Claims, 12 Drawing Sheets

(56) References Cited

U.S. PATENT DOCUMENTS

| | | | |
|---|---|---|---|
| 2008/0194263 A1* | 8/2008 | Usuda et al. | 455/442 |
| 2009/0170517 A1* | 7/2009 | Karlsson et al. | 455/436 |
| 2009/0175239 A1 | 7/2009 | Grinshpun et al. | |
| 2009/0245205 A1* | 10/2009 | Kim et al. | 370/331 |
| 2010/0056129 A1* | 3/2010 | Kono | 455/419 |
| 2011/0189997 A1* | 8/2011 | Tiwari et al. | 455/443 |
| 2011/0310851 A1 | 12/2011 | Klingenbrunn et al. | |

FOREIGN PATENT DOCUMENTS

| | | |
|---|---|---|
| WO | 2009088339 A1 | 7/2009 |
| WO | 2009096835 | 8/2009 |

OTHER PUBLICATIONS

Office Action mailed Jan. 23, 2013 for U.S. Appl. No. 13/112,655, 27 pages.

* cited by examiner

THROUGHPUT FOR INTER-RADIO ACCESS TECHNOLOGY HANDOVER

CROSS-REFERENCE TO RELATED APPLICATIONS

This application is a continuation of U.S. patent application Ser. No. 13/112,655, filed May 20, 2011, and entitled "IMPROVED THROUGHPUT FOR INTER-RADIO ACCESS TECHNOLOGY HANDOVER", the entirety of which is incorporated herein by reference.

TECHNICAL FIELD

The subject disclosure relates to wireless communications and, more particularly, to inter-radio access technology mobility.

BACKGROUND

With increasingly high demand for mobile broadband services, network operators are rushing to deploy large-scale networks. Such networks include Long Term Evolution (LTE) networks as well as other types of networks. The services that can be supported on the networks include both data (including video) and voice.

In some wireless data networks (e.g., CDMA2000 EV-D (Code Division Multiple Access 2000 Evolution-Data), UMTS (Universal Mobile Telecommunication System) networks), the maximum bit rates available are governed by both settings in the network (both core and radio) and by a category and/or a capability of the mobile device. In some cases, the mobile device can support higher maximum bit rates than the network can support and, in this case, the network sets the upper limit for the maximum bit rate. When the mobile device transitions from a first network (e.g., a current network or source network) to a second network (e.g., target network), the second network might be able to support a higher maximum bit rate than the first network was able to support. However, since the maximum bit rate has already been set, changes cannot be made when the device transitions to the second network. This is the case even if the device can support a higher maximum bit rate that is also supported by the second network. Thus, even though available, the device cannot take advantage of the higher maximum bit rates, which has a direct impact on the user experience.

The above-described deficiencies of today's systems are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

Various embodiments are configured to enable a capable device to utilize the benefits of higher data rates provided by a target network. When a device moves from a source network to a target network, the target network can dynamically initiate a quality of service modification procedure. The quality of service modification procedure can help resolve maximum bit rate and/or other quality of service parameter mismatching issues when the device moves between networks.

For example, the target network can proactively initiate an upward quality of service negotiation in order to support the device with higher data rates, which are supported by the target network. Such benefits can be obtained as part of the inter-radio access technology mobility procedure, which allows the benefits to be realized at substantially the same time as the device is handed off from the source network and/or when the device is registered with the target network.

These and other embodiments are described in more detail below.

BRIEF DESCRIPTION OF THE DRAWINGS

Various non-limiting embodiments are further described with reference to the accompanying drawings in which.

DETAILED DESCRIPTION

Overview

Figure 1:
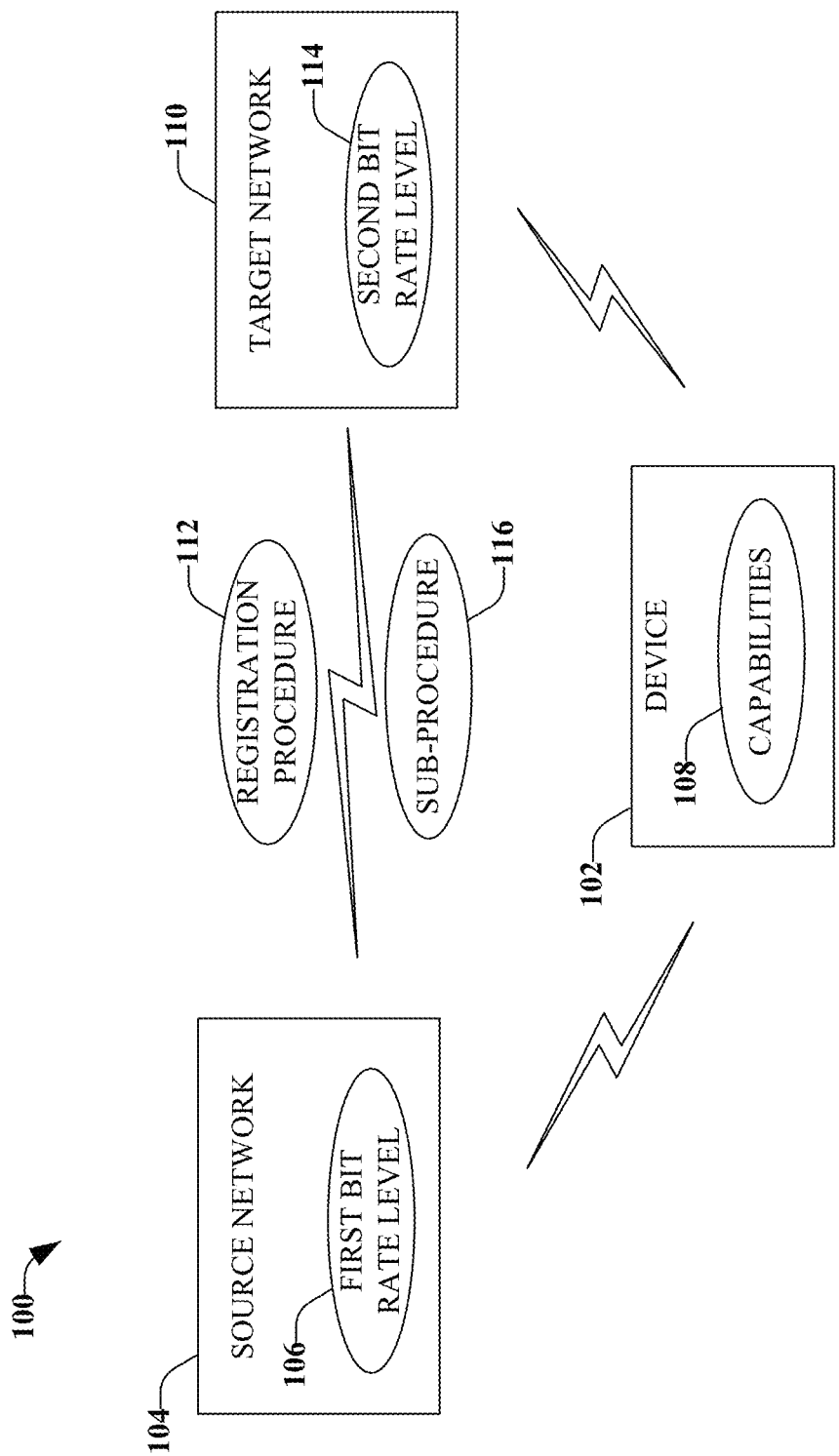
FIG. 1 illustrates a high-level block diagram of an exemplary communication system.

In various wireless data networks (e.g., CDMA2000 EV-D), UMTS networks), the maximum bit rates (MBR) available are governed by both settings in the network (both core and radio) and by the category and/or capability of a device. For example, typical MBR that can be achieved by a device in the uplink direction (e.g., from device to network) and in the downlink direction (e.g., from network to device) under ideal radio conditions is normally limited to around 5 Mbps (Mega-bits per second) and about 21 Mbps, respectively. In a 3GPP network, for example, once a mobile device (or User Equipment (UE)) Data Session Context is established, the MBR rates are recorded in a final negotiated bearer Quality of Service (QoS) profile stored in a SGSN/PDSN (Serving General Packet Radio Service (GRPS) Support Node/Packet Data Serving Node). The final negotiated bearer QoS profile is used in subsequent data transmissions. During the inter-RAT (Radio Access Technology) mobility procedure, these QoS parameter sets in the source network bearer QoS profile are carried over to the target network (e.g., a 4G network) in order to maintain session continuity. However, the target network may support data rates that are higher (or even much higher) than the data rates available in the source network. Based on current standards (e.g., 4G standards), the Mobility Control Nodes (e.g., SGSN, 4G-SGSN, MME (Mobility Management Entity)) are not able to modify (e.g., upgrade) the QoS of a capable device and, therefore, the device (and device user) is not able to have the higher target network data rates after the inter-RAT mobility procedure.

Thus, it would be beneficial to enable a capable device to utilize benefits of higher data rates provided by a target network. Such benefits can be obtained as part of the inter-RAT mobility procedure, which allows the benefits to be realized at substantially the same time as the device is handed off to the target network.

An aspect relates to an apparatus that includes a receiver component configured to obtain information related to a first set of QoS parameters supported by a source network. The apparatus also includes an evaluation component configured to perform a comparison of the first set of QoS parameters and a second set of QoS parameters supported by a target network and with a capability of a device that moved to the target network from the source network. Further, the apparatus includes a context modification component configured to negotiate a third set of QoS parameters as a function of the comparison.

In an implementation, the receiver component is further configured to receive an identity of the device, a current location of the device, and a last location of the device. The context modification component is configured to negotiate the third set of QoS parameters based on the comparison.

In another implementation, the apparatus includes a transmitter component configured to convey the third set of QoS parameters to the device. The receiver component is further configured to receive an acknowledgement of the third set of QoS parameters from the device.

In some implementations, the apparatus includes a transmitter component configured to convey to the device a maximum bit rate and an allocation retention priority.

In various implementations, the first set of QoS parameters includes a first maximum bit rate and the second set of QoS parameters includes a second maximum bit rate. The context modification component is configured to negotiate the third set of QoS parameters based, at least in part, on an analysis of the first maximum bit rate and the second maximum bit rate performed by the evaluation component.

In a further implementation, the context modification component is configured to set a third maximum bit rate of the third set of QoS parameters to a level between the first maximum bit rate and the second maximum bit rate. In some implementations, the context modification component is configured to set the third set of QoS parameters to the capability of the device.

According to some implementations, the apparatus includes a procedure initiation module configured to initiate a context modification procedure. In other implementations, the apparatus includes a data store configured to retain data related to the device, the source network, and the target network.

According to an aspect is a method that includes obtaining, by a target network configured to support a first data rate, a first set of QoS parameters associated with a device that moved from a source network configured to support a second data rate lower than the first data rate. The method also includes comparing the first set of QoS parameters with a second set of QoS parameters supported by the target network. Further, the method includes negotiating a third set of QoS parameters for the device in the target network.

In an implementation, the negotiating the third set of QoS parameters includes determining a capability of the device and setting the third set of QoS parameters to the capability of the device. In some implementations, the setting includes setting the third set of QoS parameters at a level that is lower than a level supported by the target network.

In an implementation, the method includes initiating a context modification procedure based on the comparing. The context modification procedure is initiated before the negotiating.

According to some implementations, the obtaining includes receiving an identity of the device, a current location of the device, and a last location of the device. In this implementation, the comparing includes reviewing the identity, the current location, and the last location for compatibility. The negotiation is based on the compatibility.

The comparing includes evaluating maximum bit rates included in each of the first set of QoS parameters and the second set of QoS parameters. The negotiation is based, in part, on the evaluation, according to some implementations.

The comparing includes assessing a first allocation retention priority value included in the first set of QoS parameters and a second allocation retention priority value included in the second set of QoS parameters. The negotiation is based on the assessing, in accordance with some implementations.

The method also includes transmitting the third set of QoS parameters to the device and receiving, from the device, an acknowledgement of the third set of QoS parameters, in some implementations.

Another aspect relates to a system that includes a first component configured to verify identity information of a device that moved from a source network to a target network. They system also includes a second component configured to compare subscribed quality of service parameters for a packet data session of the target network with original quality of service parameters of the source network. Further, the system includes a third component configured to initiate a modification procedure to negotiate a modified quality of service parameter in the target network. A fourth component, configured to convey the modified quality of service parameter to the device, is also included in the system.

In an implementation, the second component is further configured to compare a first maximum bit rate of the subscribed QoS parameters with a second maximum bit rate of the original QoS parameters. The modification procedure is initiated based on a difference between the first maximum bit rate and the second maximum bit rate.

In another implementation, the second component is further configured to compare a first set of allocation retention priority values of the subscribed QoS parameters with a second set of allocation retention priority values of the original QoS parameter. The modification procedure is initiated based on a difference between the first set of allocation retention priority values and the second set of allocation retention priority values.

Herein, an overview of some of the embodiments for providing improved throughput when a device moves from a first network to a second network, when the second network is capable of supporting a higher data rate (and also the device is capable of supporting the higher data rate). As a roadmap for what follows next, various exemplary, non-limiting embodiments and features for improved throughput are described in more detail. Then, some non-limiting implementations and examples are given for additional illustration, followed by representative networks and environments in which such embodiments and/or features can be implemented.

Improved Throughput for Inter-Radio Access Technology Handover

By way of further description with respect to one or more non-limiting ways to provide improved throughput during inter-RAT (Radio Access Technology) mobility procedures, a high-level block diagram of an exemplary communication system 100 is illustrated generally by FIG. 1. A device 102 can be registered in a source network 104 that is configured to provide a first bit rate level 106. The device 102 can include a category or a set of capabilities 108 that include, among other information, data rates that can be supported by the device 102. The data rates that can be supported by the device 102 might be higher than the first bit rate level 106 supported by the source network 104. Thus, when the device 102 is registered in the source network 104, the device 102 is limited to the first bit rate level 106 supported by the source network 104.

When the device 102 is moved into a coverage area supported by a different network, such as target network 110, a registration procedure 112 is performed between the source network 104 and the target network 110. As part of the registration procedure 112, the first bit rate level 106 is recorded (e.g., in a data store) and used by the target network 110 for subsequent data transmissions with the device 102. However, the target network 110 might be able to support a second bit rate level 114, which can have rates that are higher than the rates supported by the first bit rate level 106. Even though the target network 110 (and device 102) can support higher data rates, in conventional systems, such rates cannot be utilized for subsequent data transmissions and the first bit rate level 106 is instead used.

In accordance with the various aspects disclosed herein, the target network 110 is configured to support higher data rates (e.g., second bit rate level 114) than the data rates (e.g., first bit rate level 106) supported by source network 104. Thus, according to an aspect, a sub-procedure 116 is performed between the source network 104 and the target network 110. The sub-procedure 116 allows for negotiation of the bits rates. Thus, if both the target network 110 and the device 102 can support higher data rates than the rates supported by source network 104, the higher data rates are utilized for subsequent data transmissions. In such a manner, the device 102 (and device user) can benefit from the higher data rates, which can increase system speed and enhance a user experience.

In accordance with some aspects, source network 104 is configured to support a defined 2G or 3G telecommunication technology and target network 110 is configured to support a defined 4G telecommunication technology. In some aspects, source network 104 can be configured to support one of GSM (Global System for Mobile Communications), UMTS, CDMA2000 Ev-DO, or another technology. Further, in some aspects, the target network 110 can be configured to support one of HSPA (High Speed Packet Access), HSPA+, LTE, WiMax (Worldwide Interoperability for Microwave Access), or another technology.

In an embodiment, the communication system illustrated by FIG. 1 can differ in operation from a conventional communication system in order to provide additional benefits over those achievable by systems that employ original Session Context, including an original QoS setting.

Figure 2:
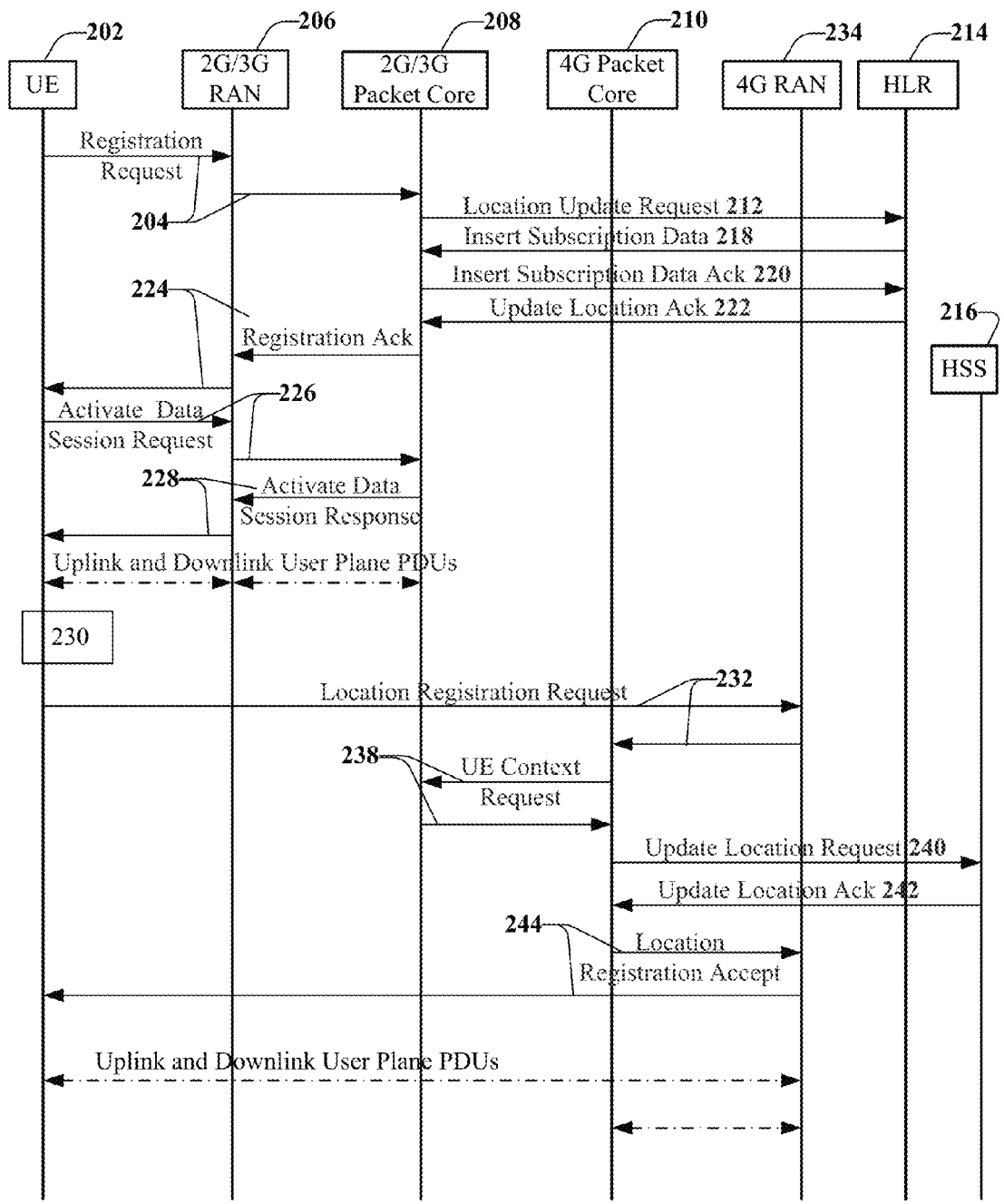
FIG. 2 illustrates a high-level call flow when a device moves from a 2G/3G network to a 4G network.

FIG. 2 illustrates a high-level call flow when a device moves from a 2G/3G network to a 4G network. Various aspects will be described herein with respect to a 2G/3G network and a 4G network. However, it should be understood that the disclosed aspects are not limited to this implementation. Instead, any particular implementation discussed herein is for purposes of describing the one or more aspects.

A User Equipment UE 202 (e.g., device) powers on under a 2G/3G coverage area (e.g., UMTS, CDMA2000 EV-DO) and starts a Registration Procedure. The Registration Procedure can be started when the UE 202 sends a Registration Request 204 to a 2G/3G Radio Access Network RAN 206, which relays the Registration Request 204 to a 2G/3G packet core control node 208. The UE 202 can convey its identity and its current location (e.g., source network) identification to the 2G/3G packet core control node 208.

The 2G/3G packet core control node 208 processes the Registration Request 204 and validates the information received from the UE 202. Then, the 2G/3G Packet Core Control Node 208 (e.g., SGSN, PDSN) sends a Location Update Request 212 to a Home Location Register HLR 214. The Location Update Request 212 includes the UE identity and the RAT technology where the UE 202 is currently located. In accordance with some aspects, the HLR 214 and a Home Subscriber Server HSS 216 can be combined.

The HLR 214 verifies the information in the Location Update Request 212. The HLR 214 looks up the subscriber database based on the UE identity provided in the Location Update Request 212 and sends the subscription data 218 to the current serving Packet Core Control Node (e.g., 2G/3G Packet Core control node 208). The subscription data 218 includes the services the UE 202 subscribes to and the subscribed QoS for each service. The subscribed QoS is based on the RAT information received from the Location Update Request 212. In the 2G/3G network, the MBR of a data session might be limited to less than about 5 Mbps for the Uplink and less than around 21 Mbps for the downlink.

The 2G/3G Packet Core Control Node 208 sends an acknowledgement ACK 220 to acknowledge the successful receipt of the UE subscription information. The HLR 214 acknowledges ACK 222 the Location Update. The 2G/3G Packet Core Control Node 208 accepts the Location Registration from the UE 202 by sending the Registration ACK 224 to the 2G/3G RAN 206, which relays the Registration ACK 224 to the UE 202. The initial mobility management procedure ends here.

The UE 202 can start initiating a data session for any particular service by sending an Active Data Session Request 226 to the 2G/3G Packet Core Control Node 208. The Active Data Session Request 226 can include the Packet Data Network Service Name. The 2G/3G RAN 206 relays the Active Data Session Request 226 from the UE 202 the 2G/3G Packet Core Control Node 208.

The 2G/3G Packet Core Control Node 208 verifies whether the PDN (Packet Data Network) Service is authorized. If the PDN Service is authorized by the subscription profile, the 2G/3G Packet Core Control Node 208 sets up the data session for the UE 202 with the QoS provided in the subscription. The uplink MBR can be less than about 5 Mbps for the Uplink and less than around 21 Mbps for the downlink. The Packet Core Control Node 208 sends the Acknowledgement 228 of the Active Data Session to the UE 202. The 2G/3G RAN 206 relays the Data Session Activation Acknowledgement 228 to the UE 202.

At this point, the uplink and the downlink data paths are established and the UE 202 can send and/or receive data to/from the packet data network.

At 230, the UE 202 moves into a 4G RAN coverage area and initiates a new location registration procedure to register with the 4G network. The UE 202 sends a Location Registration Request 232 to the 4G Packet Core Control Node 210. The Location Registration Request 232 includes the UE identity, the current location of the UE 202 (e.g., target network), and the last location of the UE 202 (e.g., source network). The 4G RAN 234 relays the Location Registration Request 232 to the 4G Packet Core Control Node 210.

The 4G Packet Core Control Node 210 (e.g., 4G-SGSN, MME) verifies the information in the Location Registration Request 232. Then, based on the old location information proved by the UE 202, the new 4G Packet Core Control Node 210 will derive the (old) 2G/3G Packet Core Control Node 208 and send a UE Context Request to the (old) 2G/3G Packet Core Control Node 208. The (old) 2G/3G Packet Core Control Node 208 verifies the old (e.g., source) location information and the old (e.g., source) identity information in the UE 202 Context Request 238 Message. Then, the (old) 2G/3G Packet Core Control Node 208 will forward the UE Mobility Context and Data Session Context to the (new) 4G Packet Core Control Node 210 for session continuity. The original QoS assignments are included in the Data Session Context transferred. In other words, now, the 4G Packet Core Control Node 210 has the UE Data Session Context with the uplink limited to less than about 5 Mbps and the downlink limited to less than around 21 Mbps.

The 4G Packet Core Control Node 210 sends an Update Location Request 240 to the HSS 216. The Update Location request 240 includes the UE identity and the current RAT where the UE 202 resides (e.g., target network).

The HSS 216 verifies the UE 202 and sends an Update Location Response 242 with the 4G subscription data to the 4G Packet Core Control Node 210. Note that in the 4G network, the subscription data can be sent within the "Update Location Response" message. Also, note that the HSS/HLR may be the same platform.

The 4G Packet Core Control Node 210 saves the subscription data and only verifies the UE identity information and Mobility Management restrictions in the subscription records in this case. Then, the 4G Packet Core Control Node 210 uses the original Session Context (including QoS setting) received from the (old) 2G/3G Packet Core Control Node 208 for data session continuity. Even though the 4G subscription data indicates that higher MBR rates are possible, the 4G packet core will not initiate an upwards QoS negotiation due to the procedure carried over from the standards (e.g., legacy 3GPP standards). The 4G Packet Core Control Node 210 sends a Location Registration Accept 244 to the UE 202. The 4G RAN 234 relays the Location Registration Accept 244 to the UE 202.

The UE 202 is now registered with the 4G network. However, its MBR rates are still limited by the original 2G/3G data rates.

The disclosed aspects can provide improved throughput when a device moves from a source network to a target network. Even though the source network supports a lower data rate than the target network, the target network can be configured to renegotiate the data rates. Through the renegotiation, the device can be supported by the target network at a higher data rate, which can be the data rate supported by the target network or the data rate capabilities of the device (if lower than the data rate supported by the target network).

Figure 3:
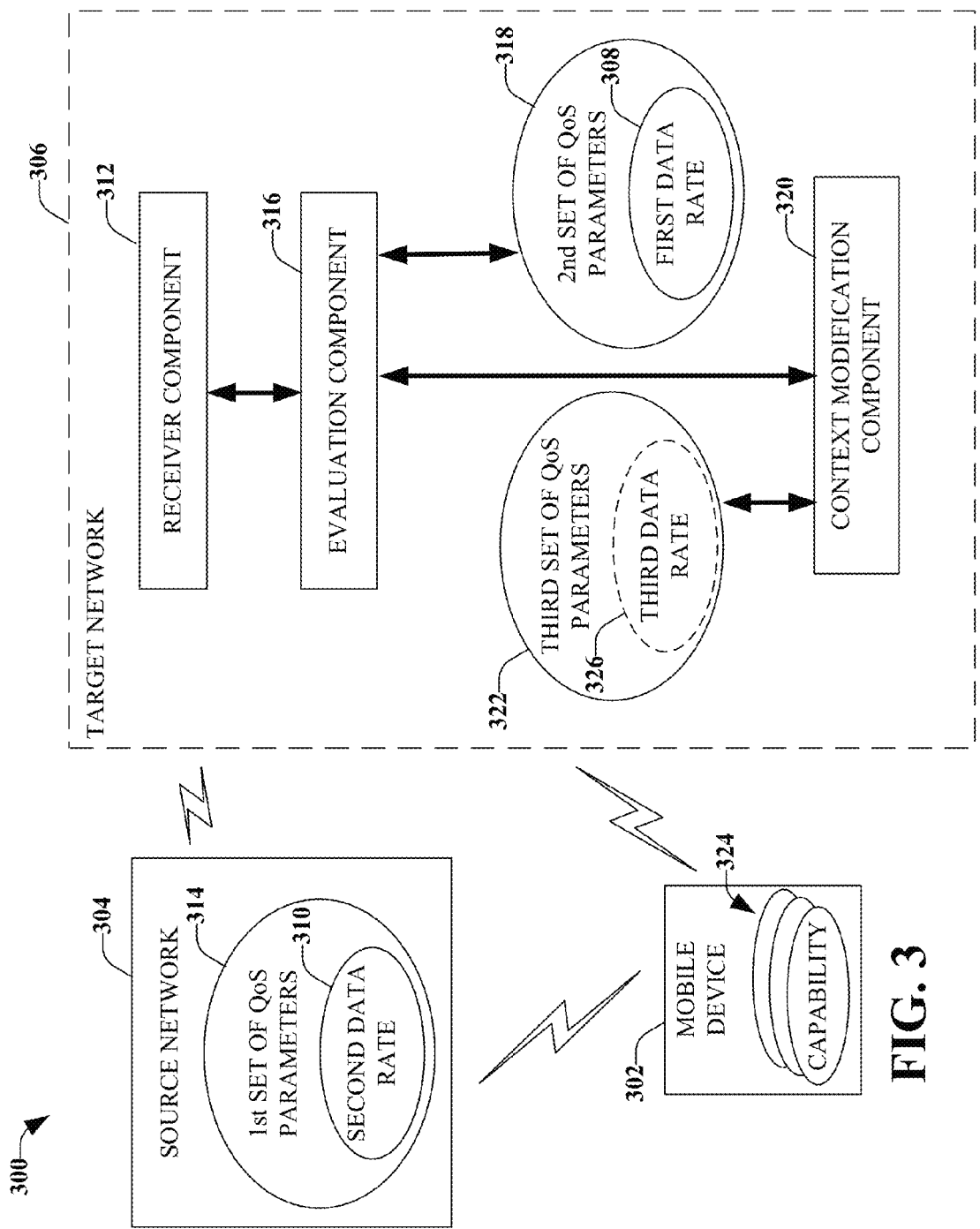
FIG. 3 illustrates a network configured to provide improved throughput when at least one device moves from a source network to a target network, according to an aspect.

FIG. 3 illustrates a network 300 configured to provide improved throughput when at least one device 302 moves from a source network 304 to a target network 306, according to an aspect. The target network 306 is configured to support a first data rate 308 and the source network 304 is configured to support a second data rate 310. The first data rate 308 is higher than the second data rate 310. For example, the first data rate can have an uplink speed of more than about 20 Mbps and a downlink speed of more than about 50 Mbps while the second data rate 310 can have an uplink speed of around 5 Mbps and a downlink speed of around 22 Mbps.

A receiver component 312 is configured to obtain a first set of QoS parameters 314 associated with the device 302 at about the same time as the device 302 moves into the coverage area of the target network 306. For example, device 302 can be registered in source network 304 that supports a geographic area. As the device 302 is moved, it can be moved into a geographic area supported by the target network 306. Based on this movement, an inter-RAT mobility procedure is initiated.

An evaluation component 316 is configured to compare the first set of QoS parameters 314 with a second set of QoS parameters 318 supported by the target network 306. The comparison is utilized to determine differences, if any, between the first set of QoS parameters 314 and the second set of QoS parameters 318.

Based on the comparison, a context modification component 320 is configured to negotiate a third set of QoS Parameters 322 for the device 302 in the target network 306. In accordance with some aspects, the third set of QoS Parameters 322 are substantially the same as the first set of QoS parameters 314 or are substantially the same as the second set of QoS parameters 318, as a function of capabilities 324 of the device 302. In some aspects, the third set of QoS parameters 322 includes a third data rate 326 that is selected as a function of capabilities 324 of the device 302.

Figure 4:
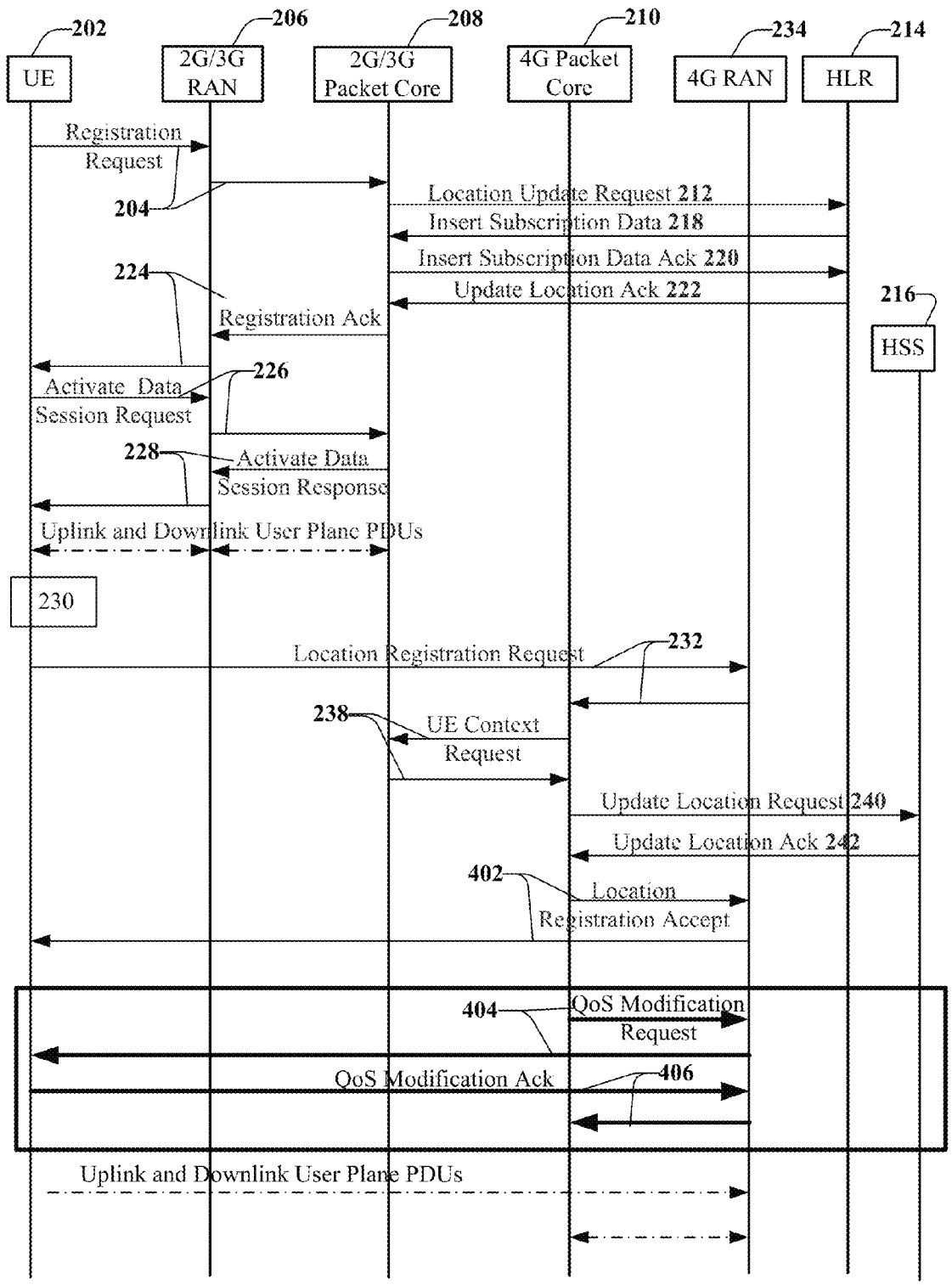
FIG. 4 illustrates a non-limiting example call flow, according to an aspect.

FIG. 4 illustrates a non-limiting example call flow 400, according to an aspect. Call flow 400 is similar to call flow 200 of FIG. 2 from the registration request 204 through the update location ACK 242 and will not be repeated with respect to FIG. 4 for purposes of simplicity.

The 4G Packet Core Control Node 210 saves the subscription data. The 4G Packet Core Control Node 210 verifies the identity information and Mobility Management restrictions in the subscription records and compares the subscribed 4G QoS for each Packet Data Session with the original QoS parameters received in the Context Exchange procedure with the 2G/3G core network. If the MBR rates are different and/or the Allocation Retention Priority (ARP) value is different, the 4G Packet Core Control Node 210 should prepare for initiation of a QoS modification procedure at about the same time as completion of the Location Registration Procedure. The 4G Packet Core Control Node 210 sends a Location Registration Accept 402 first to the UE 202. The 4G RAN 234 relays the Location Registration Accept 402 to the UE 402.

The 4G Packet Core Control Node 210 sends the QoS Modification Request 404 to the UE 202. The QoS Modification Request 404 includes the MBR parameters and the new data rate value (and/or the new ARP value). In this example, the MBR rates are 4G data rates, which can range between about 20 to about 50 or more Mbps Uplink and around 20 to around 100 Mbps Downlink, which are higher than the rates that 2G/3G networks can offer. The 4G RAN 234 relays the QoS Modification Request 404 message to the UE 202.

The UE 202 upgrades its data rates associated with the current active data sessions, which have been carried over from the 2G/3G network side. The UE 202 also sends a QoS Modification Acknowledgement 406 to the 4G Packet Core Control Node 210. The 4G RAN 234 relays the QoS Modification Acknowledgement 406 to the 4G Packet Core Control Node 210.

Now, the UE 202 has completed the registration procedure with the 4G network and both the UE 202 and 4G Packet Core Control Node 210 have been updated specific to the data session QoS settings in order to obtain the full benefit of the 4G network, or as much benefit of the 4G network that the device has the capability to support.

Figure 5:
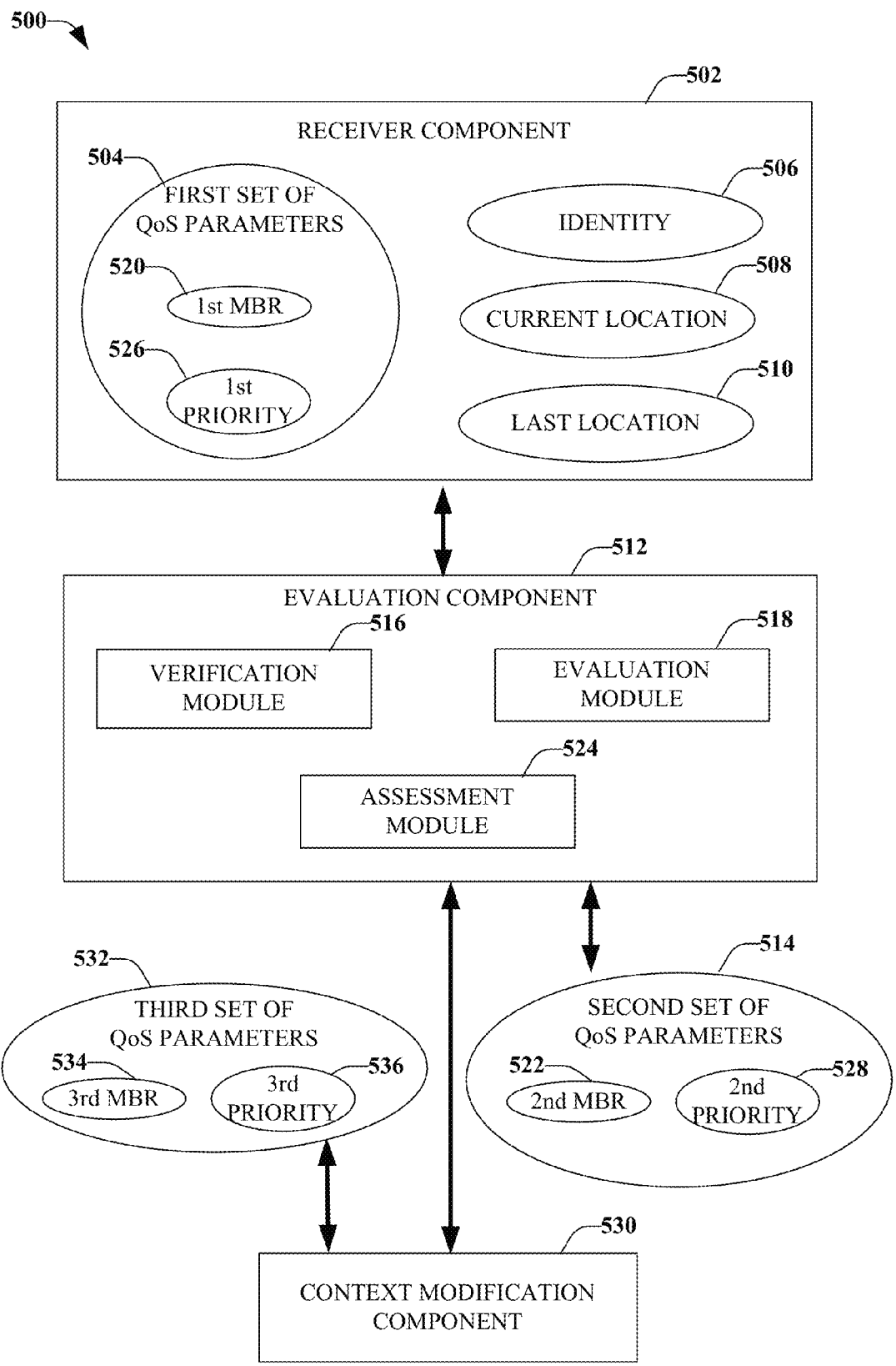
FIG. 5 illustrates an apparatus configured to resolve a maximum bit rate and/or other quality of service parameter mismatching issues when a devices moves from a first network to a second network, according to an aspect.

FIG. 5 illustrates an apparatus 500 configured to resolve a MBR rate and/or other QoS parameter mismatching issues when a devices moves from a first network to a second network, according to an aspect. The system 500 can be implemented by a network to which a mobile device is moving. In an aspect, system 500 can support data rates that are higher than the data rates that a network, from which the mobile device is moving, can support.

Included in system 500 is a receiver component 502 that is configured to receive a first set of QoS parameters 504 associated with a device that moved from a source network (or first network). The first set of QoS parameters 504 can include information related to a first data rate. In accordance with some aspects, the first set of QoS parameters 504 can include information related to QoS parameter mismatching issues, which can include a mapped Allocation Retention Priority value, throughput differences, and/or service class mismatching, for example.

In accordance with some aspects, the receiver component 502 is configured to receive an identity 506 of the mobile device. The receiver component 502 is also configured to receive information related to a current location 508 of the device and a last location 510 of the device. In accordance with some aspects, the last location 510 is the source network and the current location 508 is the target network.

Also included in system 500 is an evaluation component 512 configured to compare the first set of QoS parameters 504 with a second set of QoS parameters 514 supported by system 500. In accordance with some aspects, the evaluation component 512 includes a verification module 516 that is configured to review the identity 506 of the mobile device, the current location 508, and the last location 510 for compatibility. For example, the review by the verification module 516 can reveal if the device has the capability to support a higher data rate supported by the current location 508, a data rate supported by the last location 510, or can support a data rate there between.

In accordance with some aspects, the evaluation component 512 includes an evaluation module 518 that is configured to evaluate a first maximum bit rate (1st MBR 520) included in the first set of QoS Parameters 504 and a second maximum bit rate (2nd MBR 522) included in the second set of QoS parameters 514. The evaluation of the maximum bit rates by the evaluation module 518 can be utilized to determine changes that might need to be made to improve a user experience. For example, a modification procedure is initiated based on a difference between the 1st MBR 520 and the 2nd MBR 522.

According to some aspects, the evaluation component 512 includes an assessment module 524 that is configured to evaluate a first set of allocation retention priority values 526 included in the first set of QoS parameters 504 with a second set of allocation retention priority values 528 included in the second set of QoS parameters 514. The allocation retention priority values assessed by the assessment module 524 are utilized to resolve conflicts in demand for network resources.

The allocation retention priority values can indicate the priority of an allocation and retention of the services data flow.

For example, in a 2G/3G network, there can be a limited amount of priority values, such as three values. However, in 4G, for example, there can be a larger number of values, such as fifteen values. When the device is moved from the 2G/3G network to the 4G network, the priorities might not be well aligned and the evaluation can determine the misalignment, which can be subsequently corrected.

System 500 also includes a context modification component 530 that is configured to negotiate a third set of QoS parameters 532 for the device. The third set of QoS parameters 532 can include a third maximum bit rate 534 and/or a third set of allocation retention priority values 536.

Figure 6:
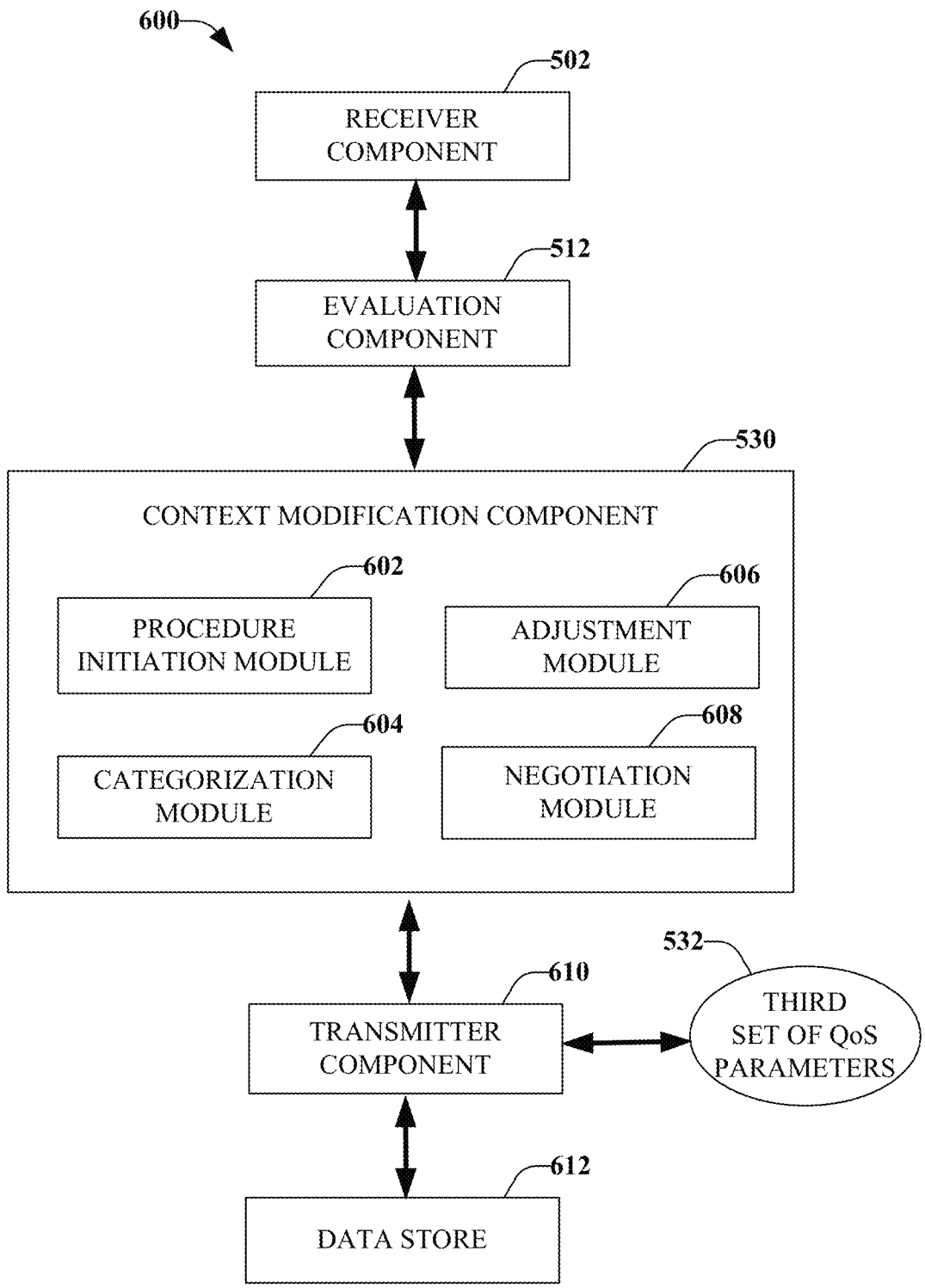
FIG. 6 illustrates an apparatus configured to provide support for a device that moves from a first network to a second network, according to an aspect.

The context modification component 530 will be discussed further with respect to FIG. 6, which illustrates an apparatus 600 configured to provide support for a device that moves from a first network (e.g., source network) to a second network (e.g., target network), according to an aspect.

Similar to FIG. 5, apparatus 600 includes a receiver component 502 that is configured to obtain various information needed to provide support to the device. Apparatus 600 also includes an evaluation component 512 configured to analyze the various information obtained by receiver component 502 with respect to various information associated with apparatus 600. Such information can include QoS parameters, maximum bit rates, allocation retention priority values, throughput differences, service class mismatching, as well as other QoS parameter mismatching issues.

Apparatus 600 also includes a context modification component 530 configured to negotiate a different QoS parameter than the QoS parameter supported by the source network, according to an aspect.

Included in context modification component 530 is a procedure initiation module 602 that is configured to initiate a context modification procedure based on the comparison by the evaluation component 512. Procedure initiation module 602 is configured to initiate the context modification procedure at about the same time as an indication that the device is to register with the target network is received. In accordance with some aspects, the context modification procedure can be initiated by procedure initiation module 602 at about the same time as the evaluation component 512 determines that there is an opportunity to increase a bit rate or resolve one or more other mismatches that occur when the device moves from the source network to the target network.

Also included in context modification component 530 is a categorization module 604 that is configured to determine at least one capability of the device. For example, the capability of the device can be ascertained based on information associated with the identity of the device as obtained by receiver component 502.

Also included in context modification component 530 is an adjustment module 606 that is configured to set a third set of QoS parameters 532 to the at least one capability of the device. In accordance with some aspects, the adjustment module 606 sets the third set of QoS parameters 532 at a level that is lower than a level supported by the target network. For example, the capabilities of the device might be lower than the target network can support, but higher than the support provided by the source network. Since the device has capabilities lower than the capabilities of the target network, the support provided by the target network is synchronized with the device capabilities.

In accordance with some aspects, receiver component 502 receives an identity of the device, a current location of the device, and a last location of the device. The evaluation component 512 reviews the identity, the current location, and the last location for compatibility. For example, the compatibility can include whether there are differences between one or more of: QoS parameters, maximum bit rates, allocation retention priority values, throughput differences, service class mismatching, as well as other QoS parameter mismatching issues. If there is compatibility (e.g., there are no, or substantially no, differences), the device can be supported at about the same level as the device was supported by the source network. However, if there are differences detected, an adjustment to the support provided to the device can be implemented by a negotiation module 608.

In accordance with some aspects, the evaluation component 512 evaluates maximum bit rates included in each of a first set of QoS parameters and a second set of QoS parameters. In this aspect, the negotiation module 608 is configured to perform negotiation based, at least in part, on the evaluation In accordance with some aspects, apparatus 600 includes a transmitter component 610 configured to convey information to the source network, the device, other networks and/or other devices. In an example, transmitter component 610 is configured to convey the third set of QoS parameters 532 to the device. The third set of QoS parameters 532 can include a set of MBR, a set of priority, and/or other parameters. Receiver component 502 can receive, from the device, an acknowledgement of the third set of QoS parameters (e.g., by receiver component 502).

In accordance with some aspects, apparatus can include at least one data store 612 configured to retain one or more parameters associated with the device, the source network, and/or the target network.

By way of example and not limitation, the disclosed aspects are configured to resolve a MBR rate and/or other QoS parameter mismatching issues when a device moves from a 2G/3G network (or other network) to a 4G network (or other network). After a 4G packet core receives a HSS subscription data, the 4G Packet Core Control Node (e.g., 4G-SGSN, MME) can compare the subscribed QoS parameters in the 4G network with the QoS parameters received from the 2G/3G network through a context exchange procedure. If there is a discrepancy, the 4G Packet Core Control Node can initiate a context modification procedure both towards the device and other Core nodes (e.g., Serving Gateway, PDN Gateway) to renegotiate the QoS parameters in the 4G network, following the location registration procedure. Thus, the disclosed aspects can proactively initiate an upward QoS negotiation and the device will be able to utilize the 4G network benefits at about the same time as the device registers with the 4G network.

Figure 7:
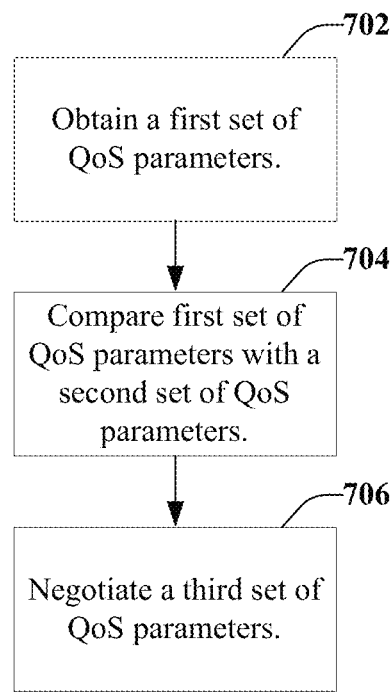
FIG. 7 illustrates a flow chart for supporting a mobile device that moves from a first network to a second network, according to an aspect.

FIG. 7 illustrates a flow chart for supporting a mobile device that moves from a source network to a target network, according to an aspect. The source network can provide different support than the support offered by the target network. At 702, the target network obtains a first set of QoS parameters associated with a device that moved from the source network to the target network. The target network can be configured to support a first data rate and the source network can be configured to support a second data rate. In an aspect, the first data rate is a higher data rate than the second data rate.

At 704, the first set of QoS parameters are compared with a second set of QoS parameters. If the comparison indicates that the first set of QoS parameters are the same, or substantially the same, as the second set of QoS parameters, no further action is taken. However, if the comparison indicates that the first set of QoS parameters are different (e.g., higher) than the second set of QoS parameters, a third set of QoS parameters are negotiated, at 706.

The negotiation can take into consideration the capabilities of the device. For example, if the capabilities of the device cannot support the first set of QoS parameters, a different set of QoS parameters are negotiated that the device can support. However, if the device has the capability to support the first set of QoS parameters, then the first set of QoS parameters are utilized to support the device.

Figure 8:
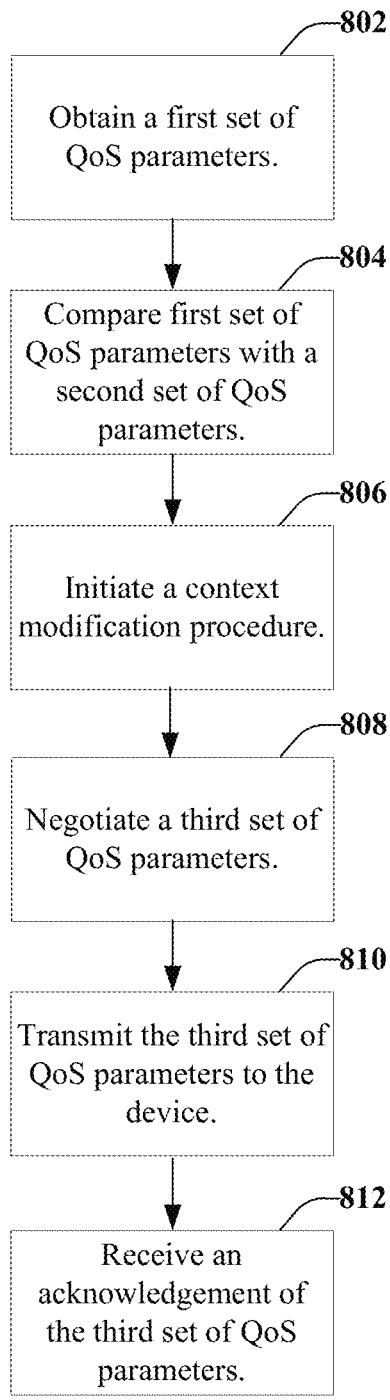
FIG. 8 illustrates a flow chart for modifying a maximum bit rate and bearer level Quality of Service during an inter-RAT mobility procedure, according to an aspect.

FIG. 8 illustrates a flow chart for modifying a maximum bit rate and bearer level QoS during an inter-RAT mobility procedure, according to an aspect. At 802, a first set of QoS parameters are obtained. The first set of QoS parameters can be obtained by a target network configured to support a first data rate. Further, the first set of QoS parameters can be associated with a device that moved from a source network configured to support a second data rate. The first data rate can be higher than the second data rate.

At 804, the first set of QoS parameters are compared with a second set of QoS parameters supported by a target network. At 806, a context modification procedure can be initiated based on the comparison performed, at 804. A third set of QoS parameters is negotiated, at 808. In accordance with some aspects, negotiating the third set of QoS parameters can include determining at least one category and/or capability of the device and setting the third set of QoS parameters to the at least one capability (or category) of the device. In some aspects, setting the third set of QoS parameters can include setting the third set of QoS parameters at a level that is lower than a level supported by the target network.

In accordance with some aspects, obtaining the first set of parameters, at 802, includes receiving an identity of the device, a current location of the device, and a last location of the device. In this aspect, the comparison, at 804, includes reviewing the identity, the current location, and the last location for compatibility. Further, the negotiation, at 808, is based, at least in part, on the compatibility determination.

According to some aspects, the comparison, at 804, includes evaluating maximum bit rates included in each of the first set of QoS parameters and the second set of QoS parameters. In this aspect, the negotiation, at 808 is based, at least in part, on the evaluation.

In some aspects, the comparison, at 804, includes assessing a first allocation retention priority value included in the first set of QoS parameters and a second allocation retention priority value included in the second set of QoS parameters. In this aspect, the negotiation, at 808, is based, at least in part, on the assessment.

At 810, the third set of QoS parameters are transmitted to the device. An acknowledgement of the third set of QoS parameters is received from the device, at 812. In an aspect, the third set of QoS Parameters are substantially the same as the first set of QoS parameters, as a function of the one or more device capabilities. In another aspect, the third set of QoS parameters are substantially the same as the second set of QoS parameters, based on the one or more device capabilities. In a further aspect, the third set of QoS parameters includes a data rate that is selected as a function of capabilities of the device. The data rate is different from a rate supported by the source network and the rate supported by the target network, according to an aspect.

Figure 9:
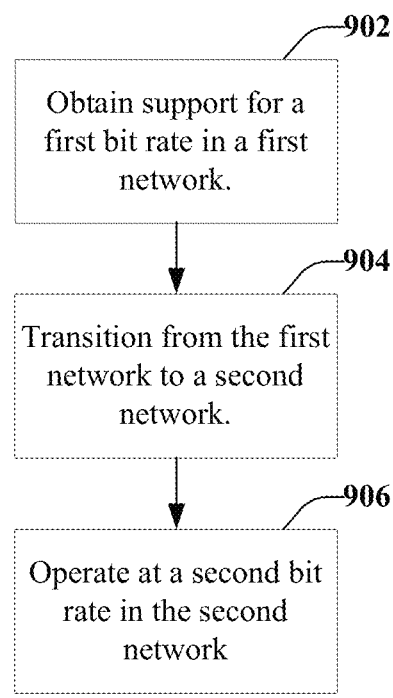
FIG. 9 illustrates a flow chart for obtaining support for higher data rates when moving from a first network to a second network, according to an aspect.

FIG. 9 illustrates a flow chart for obtaining support for higher data rates when moving from a first network to a second network, according to an aspect. The flow chart of FIG. 9 can be performed by a mobile device. At 902, support for a first bit rate is obtained and utilized in a first network. Over time, transition to a second network can occur, at 904. For example, as a mobile device is used, the mobile device might be moved out of a geographic area supported by the first network and into a geographic area supported by the second network.

At 906, operation at a second bit rate occurs in the second network. For example, the first bit rate can be a bit rate supported by the first network and the second bit rate can be a bit rate supported by the second network. In an example, the second bit rate has a higher (or faster) capacity than the first bit rate. In another example, the second bit rate has a value that is higher than the first bit rate, but lower than a bit rate that can be supported by the second network (e.g., if the device capability and/or category does not support a higher bit rate that is supported by the second network).

Operating at the second bit rate, at 906, can occur after a QoS request from the target network is received and an acknowledgement of the QoS request is transmitted to the target network.

As discussed herein, the disclosed aspects can enable a capable device to utilize benefits of higher data rates offered by a network at about the same time as the device registers with the network. For example, the device can move from a first network, that supports a first data rate, to a second network, that supports a second data rate (which is faster than the first data rate). At about the same time as the device moves into the second network, the second network can automatically initiate a quality of service modification procedure.

Exemplary Networked and Operating Environments

Figure 10:
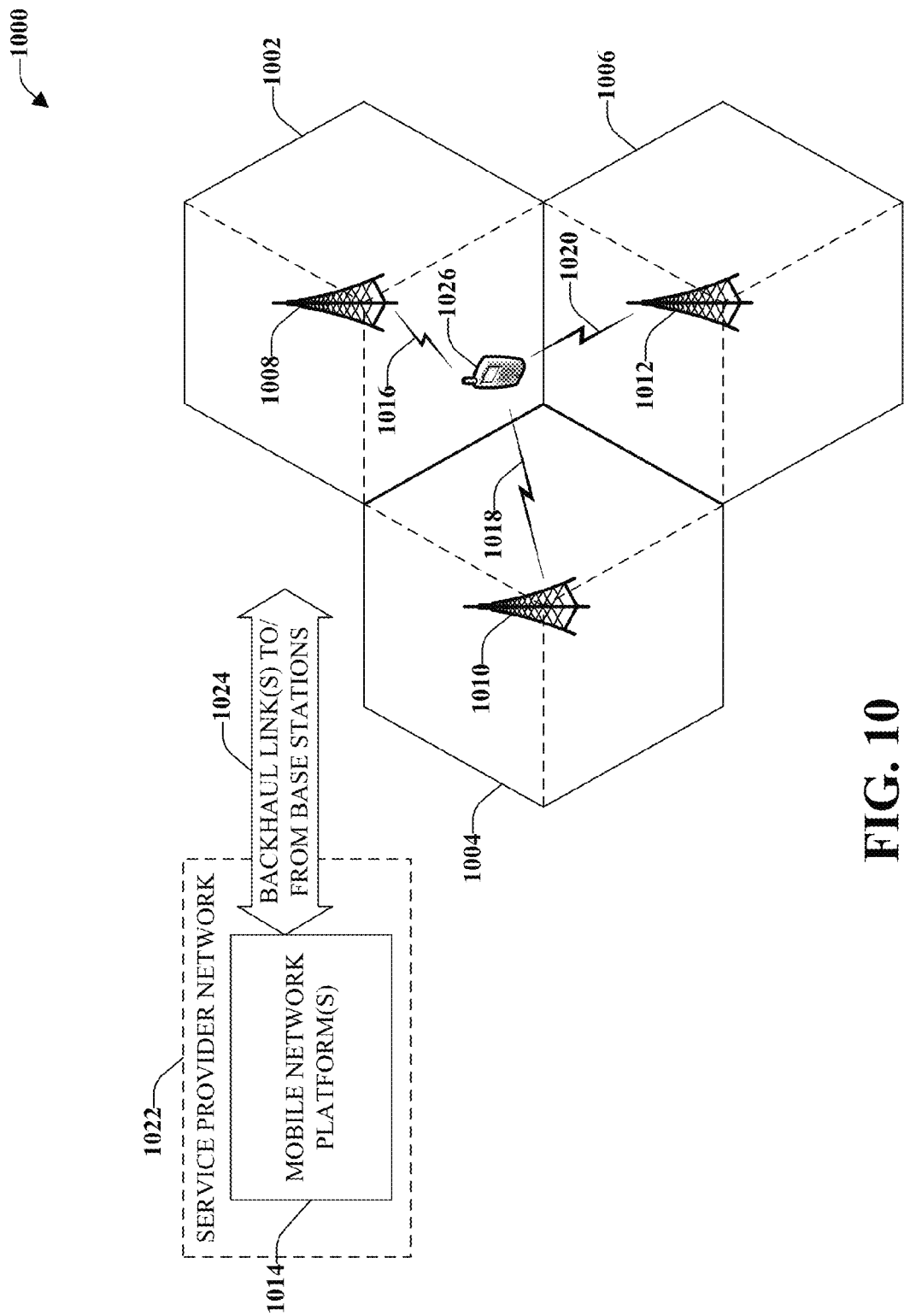
FIG. 10 is a schematic example wireless environment that can operate in accordance with aspects described herein.

By way of further description with respect to one or more non-limiting ways to provide improved throughput for inter-radio access technology handover, FIG. 10 is a schematic example wireless environment 1000 that can operate in accordance with aspects described herein. In particular, example wireless environment 1000 illustrates a set of wireless network macro cells. Three coverage macro cells 1002, 1004, and 1006 comprise the illustrative wireless environment; however, it should be appreciated that wireless cellular network deployments can encompass any number of macro cells, for example, 1004-1005 coverage macro cells. Coverage macro cells 1002, 1004, and 1006 are illustrated as hexagons; however, coverage cells can adopt other geometries generally dictated by a deployment configuration or floor plan, geographic areas to be covered, and so on. Each macro cell 1002, 1004, and 1006 is sectorized in a 2π/3 configuration in which each macro cell includes three sectors, demarcated with dashed lines in FIG. 10. It should be appreciated that other sectorizations are possible, and aspects or features of the disclosed subject matter can be exploited regardless of type of sectorization. Macro cells 1002, 1004, and 1006 are served respectively through base stations or eNodeBs 1008, 1010, and 1012. Any two eNodeBs can be considered a eNodeB site pair (NBSP). It is noted that radio component(s) are functionally coupled through links such as cables (e.g., RF and microwave coaxial lines), ports, switches, connectors, and the like, to a set of one or more antennas that transmit and receive wireless signals (not illustrated). It is noted that a radio network controller (not shown), which can be a part of mobile network platform(s) 1014, and set of base stations (e.g., eNode B 1008, 1010, and 1012) that serve a set of macro cells; electronic circuitry or components associated with the base stations in the set of base stations; a set of respective wireless links (e.g., links 1016, 1018, and 1020) operated in accordance with a radio technology through the base stations, form a macro radio access network (RAN). It is further noted, that based on network features, the radio controller can be distributed among the set of base stations or associated radio equipment. In an aspect, for UMTS-based networks, wireless links 1016, 1018, and 1020 embody a Uu interface (UMTS Air Interface).

Mobile network platform(s) 1014 facilitates circuit switched (CS)-based (e.g., voice and data) and packet-switched (PS) (e.g., internet protocol (IP), frame relay, or asynchronous transfer mode (ATM)) traffic and signaling generation, as well as delivery and reception for networked telecommunication, in accordance with various radio technologies for disparate markets. Telecommunication is based at least in part on standardized protocols for communication determined by a radio technology utilized for communication. In addition telecommunication can exploit various frequency bands, or carriers, which include any EM frequency bands licensed by the service provider 1022 (e.g., personal communication services (PCS), advanced wireless services (AWS), general wireless communications service (GWCS), and so forth), and any unlicensed frequency bands currently available for telecommunication (e.g., the 2.4 GHz industrial, medical and scientific (IMS) band or one or more of the 5 GHz set of bands). In addition, mobile network platform(s) 1014 can control and manage base stations 1008, 1010, and 1012 and radio component(s) associated thereof, in disparate macro cells 1002, 1004, and 1006 by way of, for example, a wireless network management component (e.g., radio network controller(s), cellular gateway node(s), etc.) Moreover, wireless network platform(s) can integrate disparate networks (e.g., femto network(s), Wi-Fi network(s), femto cell network(s), broadband network(s), service network(s), enterprise network(s), and so on). In cellular wireless technologies (e.g., 3rd Generation Partnership Project (3GPP) Universal Mobile Telecommunication System (UMTS), Global System for Mobile Communication (GSM)), wireless network platform 1014 is embodied in a core network and a set of radio network controllers.

In addition, wireless backhaul link(s) 1024 can include wired link components like T1/E1 phone line; a digital subscriber line (DSL) either synchronous or asynchronous; an asymmetric DSL (ADSL); an optical fiber backbone; a coaxial cable, etc.; and wireless link components such as line-of-sight (LOS) or non-LOS links which can include terrestrial air-interfaces or deep space links (e.g., satellite communication links for navigation). In an aspect, for UMTS-based networks, wireless backhaul link(s) 1024 embodies IuB interface.

It should be appreciated that while exemplary wireless environment 1000 is illustrated for macro cells and macro base stations, aspects, features and advantages of the disclosed subject matter can be implemented in microcells, picocells, femto cells, or the like, wherein base stations are embodied in home-based access points.

Figure 11:
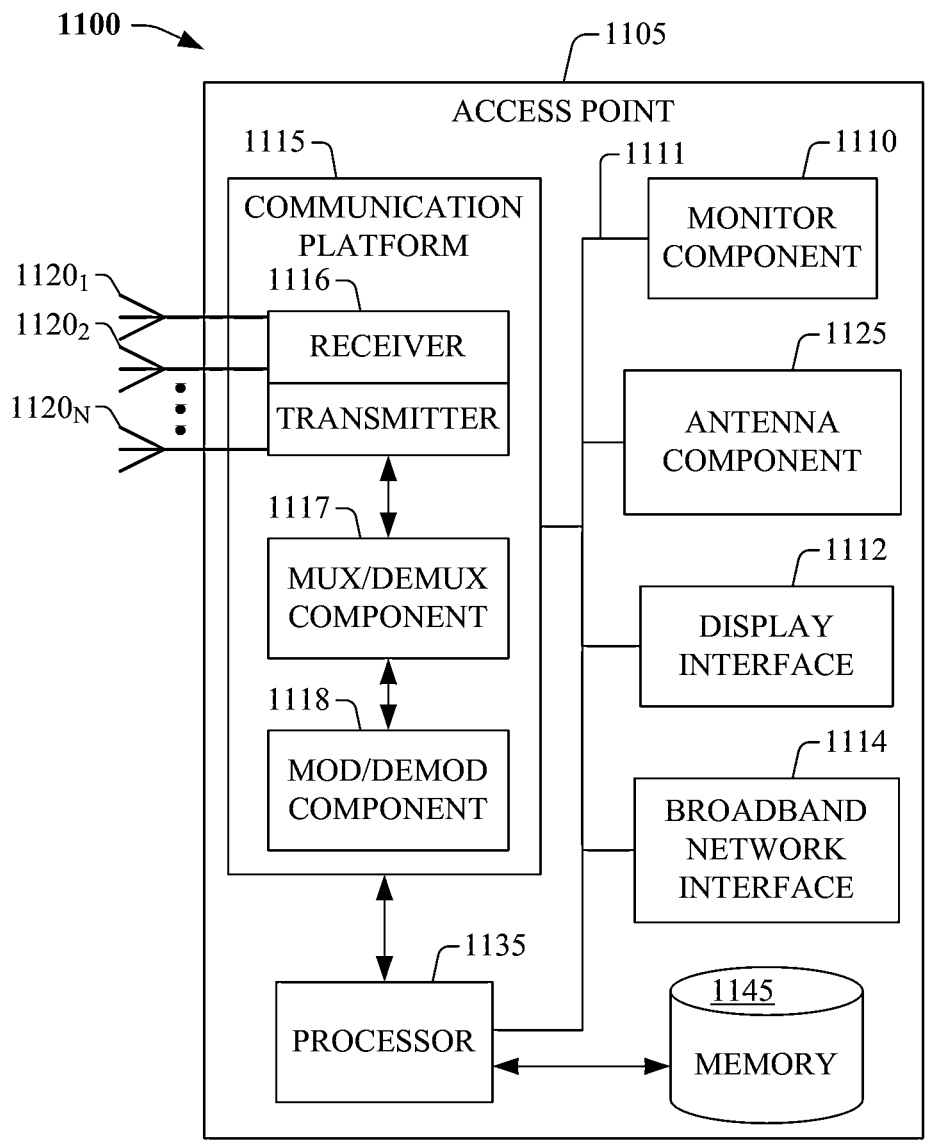
FIG. 11 illustrates a block diagram of an access point, in accordance with an embodiment.

To provide further context for various aspects of the disclosed subject matter, FIG. 11 illustrates a block diagram of an embodiment 1100 of an access point 1105, e.g., base station, wireless access point, femtocell access point, etc. that can enable and/or exploit features or aspects of the disclosed subject matter.

In embodiment 1100, access point 1105 can receive and transmit signal(s) from and to wireless devices, wireless ports, wireless routers, etc. through segments $1120_1$-$1120_N$ (N is a positive integer). Segments $1120_1$-$1120_N$ can be internal and/or external to access point 1105, and can be controlled by (1) monitor component 1110 and (2) antenna component 1125. Further, monitor component 1110 and antenna component 1125 can couple to communication platform 1115, which comprises electronic components and associated circuitry that provide for processing and manipulation of received signal(s) and other signal(s) to be transmitted.

In an aspect, communication platform 1115 includes a receiver/transmitter 1116 that can convert analog signals to digital signals upon reception of the analog signals, and convert digital signals to analog signals upon transmission. In addition, receiver/transmitter 1116 can divide a single data stream into multiple, parallel data streams, or perform the reciprocal operation. Coupled to receiver/transmitter 1116 is a multiplexer/demultiplexer 1117 that facilitates manipulation of signals in time and frequency space. Electronic component 1117 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 1117 can scramble and spread information, e.g., codes, according to substantially any code known in the art, e.g., Hadamard-Walsh codes, Baker codes, Kasami codes, polyphase codes, etc. A modulator/demodulator 1118 is also a part of communication platform 1115, and can modulate information according to multiple modulation techniques, such as frequency modulation, amplitude modulation, e.g., M-ary quadrature amplitude modulation (QAM), with M a positive integer); phase-shift keying (PSK); etc.

Access point 1105 also includes a processor 1135 configured to confer, at least in part, functionality to substantially any electronic component in access point 1105. In particular, processor 1135 can facilitate configuration of access point 1105 via, e.g., monitor component 1110, antenna component 1125, and one or more component therein. Additionally, access point 1105 can include display interface 1112, which can display functions that control functionality of access point 1105, or reveal operation conditions thereof. In addition, display interface 1112 can include a screen to convey information to an end user. In an aspect, display interface 1112 can be an LCD (Liquid Crystal Display), a plasma panel, a monolithic thin-film based electrochromic display, and so on. Moreover, display interface 1112 can also include a component (e.g., speaker) that facilitates communication of aural indicia, which can also be employed in connection with messages that convey operational instructions to an end user. Display interface 1112 can also facilitate data entry e.g., through a linked keypad or via touch gestures, which can cause access point 1105 to receive external commands, e.g., restart operation.

Broadband network interface 1114 facilitates connection of access point 1105 to a service provider network (not shown) that can comprise one or more cellular technologies (e.g., 3GPP UMTS, GSM, etc.) via backhaul link(s) (not shown), which enable incoming and outgoing data flow. Broadband network interface 1114 can be internal or external to access point 1105, and can utilize display interface 1112 for end-user interaction and status information delivery.

Processor 1135 can be functionally connected to communication platform 1115 and can facilitate operations on data, e.g., symbols, bits, or chips, for multiplexing/demultiplexing, such as effecting direct and inverse fast Fourier transforms, selection of modulation rates, selection of data packet formats, inter-packet times, etc. Moreover, processor 1135 can be functionally connected, via data, system, or address bus 1111, to display interface 1112 and broadband network interface 1114, to confer, at least in part, functionality to each of such components.

In access point 1105, memory 1145 can retain location and/or coverage area, e.g., macro sector, identifier(s); access list(s) that authorize access to wireless coverage through access point 1105; sector intelligence that can include ranking of coverage areas in the wireless environment of access point 1105, radio link quality and strength associated therewith, or the like. Memory 1145 also can store data structures, code instructions and program modules, system or device information, code sequences for scrambling, spreading and pilot transmission, access point configuration, and so on. Processor 1135 can be coupled, e.g., via a memory bus, to memory 1145 in order to store and retrieve information used to operate and/or confer functionality to the components, platform, and interface that reside within access point 1105.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," and substantially any other information storage component relevant to operation and functionality of a component and/or process, refer to "memory components," or entities embodied in a "memory," or components comprising the memory. It will be appreciated that the memory components described herein can be either volatile memory or nonvolatile memory, or can include both volatile and nonvolatile memory.

By way of illustration, and not limitation, nonvolatile memory, for example, can be included in memory 1045, non-volatile memory (see below), disk storage (see below), and memory storage (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 12:
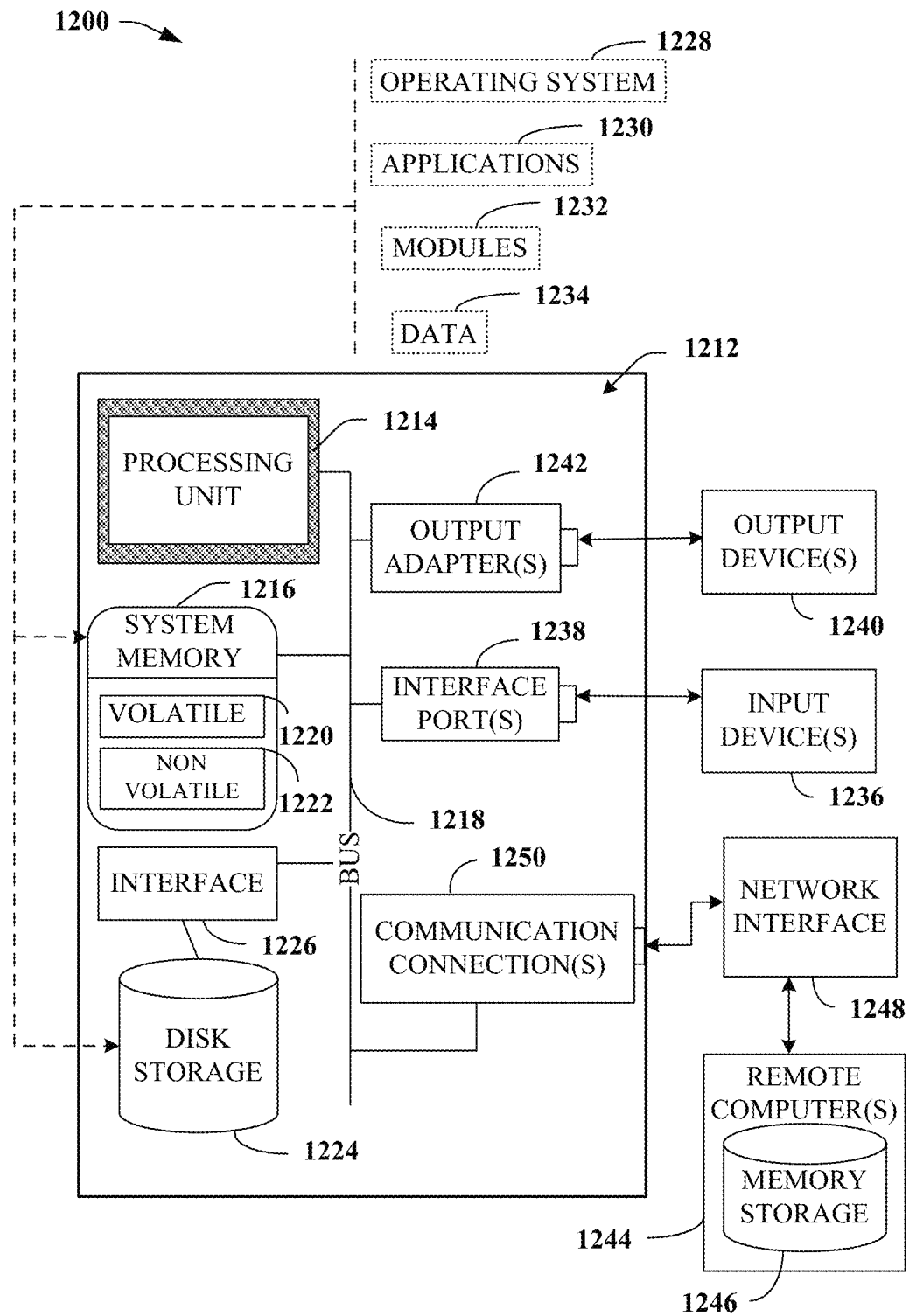
FIG. 12 illustrates a block diagram of a computing system, in accordance with an embodiment.

In order to provide a context for the various aspects of the disclosed subject matter, FIG. 12, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the various aspects also can be implemented in combination with other program modules. Generally, program modules include routines, programs, components, data structures, etc. that perform particular tasks and/or implement particular abstract data types.

Moreover, those skilled in the art will appreciate that the various aspects can be practiced with other computer system configurations, including single-processor or multiprocessor computer systems, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

With reference to FIG. 12, a block diagram of a computing system 1200 operable to execute the disclosed systems and methods is illustrated, in accordance with an embodiment. Computer 1212 includes a processing unit 1214, a system memory 1216, and a system bus 1218. System bus 1218 couples system components including, but not limited to, system memory 1216 to processing unit 1214. Processing unit 1214 can be any of various available processors. Dual microprocessors and other multiprocessor architectures also can be employed as processing unit 1214.

System bus 1218 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1194), and Small Computer Systems Interface (SCSI).

System memory 1216 includes volatile memory 1220 and nonvolatile memory 1222. A basic input/output system (BIOS), containing routines to transfer information between elements within computer 1212, such as during start-up, can be stored in nonvolatile memory 1222. By way of illustration, and not limitation, nonvolatile memory 1222 can include ROM, PROM, EPROM, EEPROM, or flash memory. Volatile memory 1220 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1212 also includes removable/non-removable, volatile/non-volatile computer storage media. FIG. 12 illustrates, for example, disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to system bus 1218, a removable or non-removable interface is typically used, such as interface 1226.

It is to be appreciated that FIG. 12 describes software that acts as an intermediary between users and computer resources described in suitable operating environment 1200. Such software includes an operating system 1228. Operating system 1228, which can be stored on disk storage 1224, acts to control and allocate resources of computer system 1212. System applications 1230 take advantage of the management of resources by operating system 1228 through program modules 1232 and program data 1234 stored either in system memory 1216 or on disk storage 1224. It is to be appreciated that the disclosed subject matter can be implemented with various operating systems or combinations of operating systems.

A user can enter commands or information, e.g., via interface component 1226, into computer system 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to processing unit 1214 through system bus 1218 via interface port(s) 1238. Interface port(s) 1238 include, for example, a serial port, a parallel port, a game port, and a universal serial bus (USB). Output device(s) 1240 use some of the same type of ports as input device(s) 1236.

Thus, for example, a USB port can be used to provide input to computer 1212 and to output information from computer 1212 to an output device 1240. Output adapter 1242 is provided to illustrate that there are some output devices 1240 like monitors, speakers, and printers, among other output devices 1240, which use special adapters. Output adapters 1242 include, by way of illustration and not limitation, video and sound cards that provide means of connection between output device 1240 and system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. Remote computer(s) 1244 can be a personal computer, a server, a router, a network PC, a workstation, a microprocessor based appliance, a peer device, or other common network node and the like, and typically includes many or all of the elements described relative to computer 1212.

For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refer(s) to hardware/software employed to connect network interface 1248 to bus 1218. While communication connection 1250 is shown for illustrative clarity inside computer 1212, it can also be external to computer 1212. The hardware/software for connection to network interface 1248 can include, for example, internal and external technologies such as modems, including regular telephone grade modems, cable modems and DSL modems, ISDN adapters, and Ethernet cards.

It is to be noted that aspects, features, or advantages of the aspects described in the subject specification can be exploited in substantially any communication technology. For example, 4G technologies, Wi-Fi, WiMAX, Enhanced GPRS, 3GPP LTE, 3GPP2 UMB, 3GPP UMTS, HSPA, HSDPA, HSUPA, GERAN, UTRAN, LTE Advanced. Additionally, substantially all aspects disclosed herein can be exploited in legacy telecommunication technologies; e.g., GSM. In addition, mobile as well non-mobile networks (e.g., Internet, data service network such as IPTV) can exploit aspect or features described herein.

Various aspects or features described herein can be implemented as a method, apparatus, or article of manufacture using standard programming and/or engineering techniques. In addition, various aspects disclosed in the subject specification can also be implemented through program modules stored in a memory and executed by a processor, or other combination of hardware and software, or hardware and firmware.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What has been described above includes examples of systems and methods that provide advantages of the one or more aspects. It is, of course, not possible to describe every conceivable combination of components or methods for purposes of describing the aspects, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

As used in this application, the terms "component," "system," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration, both an application running on a server or network controller, and the server or network controller can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software, or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. As further yet another example, interface(s) can include input/output (I/O) components as well as associated processor, application, or Application Programming Interface (API) components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

What is claimed is:

1. A system, comprising:
    a processor; and
    a memory that stores executable instructions that, when executed by the processor, facilitate performance of operations, comprising:
        accessing information that indicates that the device is to register in order to connect to a target network;
        based on the information, comparing first quality of service parameter information supported by a source device associated with the source network with second quality of service parameter information supported by a target device associated with the target network, wherein the device supports a first data rate, the first quality of service parameter information
comprises a second data rate and the second quality of
service parameter information comprises a third data
rate that is greater than the second data rate;

initiating an upward quality of service negotiation from the first quality of service parameter information associated with the second data rate to a second quality of service parameter information based on a determination that the second quality of service parameter information is mismatched with the first quality of service parameter information, wherein the determination is made based on the target device being determined to be configured to provide a higher level of quality of service than the first quality of service;

setting a third quality of service parameter information to a level that is greater than a first level supported by the source device and that is less than a second level supported by the target device, wherein the third quality of service comprises a fourth data rate; and assigning the fourth data rate to the device for application to a connection to the target device, wherein the fourth data rate is a data rate that is greater than the second data rate supported by the source device and that is less than the third data rate supported by the target device, and wherein the assigning the fourth data rate is responsive to determining that the first data rate is higher than the second data rate and is responsive to determining that the third data rate is higher than the second data rate.

2. The system of claim 1, wherein the operations further comprise determining the fourth data rate to be equal to the first data rate, and wherein the third data rate is a higher rate than the first data rate.

3. The system of claim 1, wherein the second data rate comprises a first maximum bit rate and the third data rate comprises a second maximum bit rate, and the operations further comprise determining the fourth data rate based on an analysis of the first maximum bit rate and the second maximum bit rate.

4. The system of claim 3, wherein the operations further comprise determining a third maximum bit rate for the fourth data rate.

5. The system of claim 1, wherein the device is a first device, and wherein the operations further comprise communicating to the device a maximum bit rate and an assigned value for conflict resolution in response to the first device and a second device requesting a resource of the target device.

6. The system of claim 1, wherein the operations further comprise assigning, to the device, a highest available data rate selected from a group of rates comprising the first data rate, the second data rate, and the third data rate.

7. The system of claim 1, wherein the operations further comprise:
receiving information related to a device identity, a first location of the device, and a second location of the device; and
determining the fourth data rate based on a compatibility of the device at the first location and the second location, wherein the compatibility is determined as a function of the device identity and the first data rate.

8. The system of claim 1, wherein the operations further comprise initiating transmission of the fourth data rate to the device.

9. The system of claim 1, wherein the target device is configured to provide a higher level of quality of service than the second quality of service via the third data rate being greater than the second data rate.

10. The system of claim 1, wherein the initiating the upward quality of service negotiation from the first quality of service parameter information associated with the second data rate to the third quality of service parameter information is further based on a capability of the device.

11. The system of claim 1, wherein the initiating the upward quality of service negotiation from the first quality of service parameter information associated with the second data rate to the third quality of service parameter information is further based on a location of the device.

12. A non-transitory machine-readable storage medium, comprising executable instructions that, when executed by a processor, facilitate performance of operations, comprising:
comparing first quality of service parameter information supported by a source device associated with a source network with second quality of service parameter information supported by a target device associated with a target network, wherein the comparing is performed based on information indicating that the device requests registration with the target network using a current connection with the source network, and wherein the device supports a first data rate, the first quality of service parameter information comprises a second data rate and the second quality of service parameter information comprises a third data rate that is greater than the second data rate;

initiating an increase in quality of service from the first quality of service parameter information associated with the second data rate to a third quality of service parameter information based on a first determination that the second quality of service parameter information provides an opportunity for increased quality of service relative to the first quality of service parameter information, wherein the first determination is based on a second determination that the target device is configured to provide a higher level of quality of service than the first quality of service;

setting a third quality of service parameter information to a level that is between a first level supported by the source device and a second level supported by the target device, wherein a third quality of service comprises a fourth data rate; and assigning the fourth data rate to the device for application to a connection to the target device, wherein the fourth data rate is a data rate that is greater than the second data rate supported by the source device and that is less than the third data rate supported by the target device, and wherein the assigning the fourth data rate is responsive to determining that the first data rate is higher than the second data rate and is responsive to determining that the third data rate is higher than the second data rate.

13. The non-transitory machine readable storage medium of claim 12, wherein the second data rate comprises a first maximum bit rate and the third data rate comprises a second maximum bit rate, the operations further comprise determining the fourth data rate based on an analysis of the first maximum bit rate and the second maximum bit rate.

14. The non-transitory machine readable storage medium of claim 12, wherein the device is a first device, and wherein the operations further comprise communicating to the first device a maximum bit rate and an assigned value for conflict resolution in response to the first device and a second device requesting a resource of the target device.

15. A method, comprising:
comparing, by an apparatus comprising a processor, first quality of service parameter information supported by a source device associated with a source network with second quality of service parameter information supported by a target device associated with a target network, wherein the device supports a first data rate, the first quality of service parameter information comprises a second data rate and the second quality of service parameter information comprises a third data rate that is greater than the second data rate;

initiating, by the apparatus, a quality of service negotiation from the first quality of service parameter information associated with the second data rate to a third quality of service parameter information based on a determination, based on a defined criterion being satisfied, that the second quality of service parameter information will increase quality of service relative to the first quality of service parameter information, wherein the defined criterion is satisfied based on the target device having been determined to be configured to provide a higher level of quality of service than the first quality of service;

setting, by the apparatus, the third quality of service parameter information to a level that is between a first level supported by the source device and a second level supported by the target device, wherein the third quality of service comprises a fourth data rate; and assigning, by the apparatus, the fourth data rate to the device for application to a connection to the target device, wherein the fourth data rate is a data rate that is greater than the second data rate supported by the source device and that is less than the third data rate supported by the target device, and wherein the assigning the fourth data rate is responsive to determining that the first data rate is higher than the second data rate and is responsive to determining that the third data rate is higher than the second data rate.

16. The method of claim 15, wherein the second data rate comprises a first maximum bit rate and the third data rate comprises a second maximum bit rate.

17. The method of claim 16, further comprising:
determining, by the apparatus, the fourth data rate based on an analysis of the first maximum bit rate and the second maximum bit rate.

18. The method of claim 15, further comprising:
communicating, by the apparatus, to the device a maximum bit rate and an assigned value for conflict resolution.

19. The method of claim 18, wherein the communicating is in response to the device requesting a resource of the target device.

20. The method of claim 15, wherein the initiating the quality of service negotiation from the first quality of service parameter information associated with the second data rate to the third quality of service parameter information is further based on a first location and a second location of the device.

* * * * *